US009665807B2

(12) United States Patent
Gao et al.

(10) Patent No.: US 9,665,807 B2
(45) Date of Patent: May 30, 2017

(54) RASTER PROCESSING METHOD AND APPARATUS OF TRANSPARENT FORM (71) Applicants: PEKING UNIVERSITY FOUNDER GROUP CO., LTD., Beijing (CN); FOUNDER INFORMATION INDUSTRY HOLDINGS CO., LTD., Beijing (CN); BEIJING FOUNDER ELECTRONICS CO., LTD., Beijing (CN)

(72) Inventors: Yufang Gao, Beijing (CN); Zhangwei Meng, Beijing (CN)

(73) Assignees: PEKING UNIVERSITY FOUNDER GROUP CO., LTD., Beijing (CN); FOUNDER INFORMATION INDUSTRY HOLDINGS CO., LTD., Beijing (CN); BEIJING FOUNDER ELECTRONICS CO., LTD., Beijing (CN)

(*) Notice: Subject to any disclaimer, the term of this patent is extended or adjusted under 35 U.S.C. 154(b) by 0 days.

(21) Appl. No.: 14/915,966

(22) PCT Filed: Nov. 1, 2013

(86) PCT No.: PCT/CN2013/086387
§ 371 (c)(1),
(2) Date: Mar. 2, 2016

(87) PCT Pub. No.: WO2015/032125
PCT Pub. Date: Mar. 12, 2015

(65) Prior Publication Data
US 2016/0210538 A1 Jul. 21, 2016

(30) Foreign Application Priority Data
Sep. 4, 2013 (CN) .......................... 2013 1 0396205

(51) Int. Cl.
G06K 15/00 (2006.01)
G06K 15/02 (2006.01)
(Continued)

(52) U.S. Cl.
CPC ..... *G06K 15/1861* (2013.01); *G06F 17/2264* (2013.01); *G06K 15/181* (2013.01); *G06K 15/1822* (2013.01); *G06K 15/1836* (2013.01)

(58) Field of Classification Search
CPC ............. G06K 15/1861; G06K 15/181; G06K 15/1822; G06K 15/1836; G06F 17/2264
See application file for complete search history.

(56) References Cited

U.S. PATENT DOCUMENTS

2008/0002896 A1* 1/2008 Lu ........................... G06T 9/005
382/232
2011/0157619 A1* 6/2011 Nelson .................... G06T 11/40
358/1.15

FOREIGN PATENT DOCUMENTS

CN 101118480 A 2/2008
CN 101576995 A 11/2009

* cited by examiner

Primary Examiner — Quang N Vo
(74) Attorney, Agent, or Firm — Brinks Gilson & Lione (57) ABSTRACT Provided are a raster processing method and apparatus of a transparent Form. The method comprising: determining a reusable transparent Form in a page description file; performing syntax interpretation on the transparent Form to obtain a reuse type and position information of the transparent Form; generating a color block lattice, an Alpha block lattice, a Shape block lattice and their corresponding block attribute tables and block memory tables for the transparent Form, according to the reuse type and the position information, and establishing association relationships between different transparent Forms in the page description file; computing on the generated data information to obtain and buffer (Continued)

assembling information of the transparent Form, according to the reuse type of the transparent Form; determining an assembling manner of the transparent Form according to the reuse type of the transparent Form and assembling the transparent Form into the page to be outputted.

11 Claims, 5 Drawing Sheets

(51) Int. Cl.
    *G06F 17/22*     (2006.01)
    *H04N 1/40*     (2006.01)

RASTER PROCESSING METHOD AND APPARATUS OF TRANSPARENT FORM

CROSS-REFERENCE TO RELATED APPLICATIONS

This application is a national application of PCT/CN2013/0876387, filed on Nov. 1, 2013, which application claims a right of priority to Chinese Patent Application No. 201310396205.1, filed Sep. 4, 2013, both of which are incorporated herein by reference in their entirety.

TECHNICAL FIELD

This invention relates to the field of publishing technology, and more particularly to a raster processing method and apparatus of transparent Forms.

DESCRIPTION OF THE RELATED ART

Raster Image Processing (RIP) refers to interpreting and converting layout information described in a page description language into digital signals capable of being outputted from an output device, wherein a file is converted into a lattice of image and then is outputted from the output device.

The RIP process may be divided into two steps: in a first step, page content is interpreted to analyze every object of the page description language, obtain required parameters and data information and store in an intermediate instruction file; and in a second step, assembling output is performed, parameters and data are read out from the intermediate instruction file one by one and relevant calculation is performed to obtain a final page lattice.

The above two steps need to be performed on each object in a page, including simple objects, such as graphs, text, images and etc., and complex objects, such as Forms. A Form is a PDF content stream that may include description of any objects, which corresponds to packaging those objects as a separate sub-page description unit. A Form can be reused and drawn multiple times in the same page or different pages, with different effects depending on the condition of a graph being drawn. If a Form includes complex contents, much information has to be written into the intermediate instruction file each time the Form is interpreted in RIP, and a lattice calculation must be performed for each assembling process. Thereby, time and space resources may be wasted due to multiple times of interpreting and assembling of the Form, which may cause low efficiency of the whole raster processing of a PDF file.

In order to solve the problem of low rasterizing efficiency of reused Forms, a technique called as Form lattice reuse has been proposed. When page contents are interpreted in RIP, a Form satisfying some reuse condition may be packaged into a sub-page and then is rasterized, i.e., the sub-page is interpreted and is assembled to generate a Form lattice and its Mask lattice, which are buffered along with parameters related to the Form. If a Form having a name, a number of bits, and a scaling factor consistent with those of a Form buffered previously, except for a shift in its position, is found in the process of page interpretation, the lattice of the Form may be calculated according to the lattice of the Form buffered previously and a position relationship between the two Forms. Therefore, it is unnecessary to interpret the sub-page of the Form, and it is only required to store parameters relevant to the Form and an association relationship with a buffered Form. In the assembling output process of RIP, when a reused Form is found, its buffered Form lattice is read out or a required lattice is obtained according to the association relationship. According to Mask values, the Form lattice is assembled into a page to be output, on the basis of lines or blocks, in a top layer dominant manner (i.e., top information is dominant and may completely override lower-layer information). Thus, only one interpreting and generating process is required for the plurality of reused Forms, and the assembling may be simplified as memory copying or calculations for multiple times, greatly reducing overhead in time and space and significantly improving the efficiency of the whole file raster processing.

However, this type of Mask and Form lattice reuse as well as the top layer dominant assembling is only applicable to the reuse of a non-transparent Form with a non-transparent graphics status before the drawing of the Form. In the transparent mode, all objects that are drawn at the same dot have contributions to the finally rendered color of that dot, and the assembling process comprises transparency calculation of objects in each layer, rather than top layer dominant.

Therefore, in the case of a transparent Form or a non-transparent Form in a transparent graphics status is reused for multiple times, the Form still has to be interpreted and assembled several times.

SUMMARY OF THE INVENTION

One object of this invention is to provide a raster processing method and apparatus of transparent Forms to improve the efficiency of raster processing of a transparent Form file that is reused.

A raster processing method of a transparent Form is provided in an embodiment of this invention, comprising:
determining a reusable transparent Form in a page description file;
performing syntax interpretation on the transparent Form to obtain a reuse type and position information of the transparent Form;
generating a Color block lattice, an Alpha block lattice, a Shape block lattice and their corresponding block attribute tables and block memory tables for the transparent Form, according to the reuse type and position information, and establishing association relationships between different transparent Forms in the page description file;
computing on the generated data information to obtain and buffer assembling information of the transparent Form, according to the reuse type of the transparent Form;
determining an assembling manner of the transparent Form according to the reuse type of the transparent Form and graphics status of the page to be outputted, in assembling of the transparent Form;
assembling the transparent Form into the page to be outputted, according to the determined assembling manner and based on the assembling information and the association relationships.

A raster processing apparatus of a transparent Form is provided in an embodiment of this invention, comprising:
a reuse management module, for making determination on transparent Forms that have been found in a page interpretation process of RIP to determine a reusable transparent Form in a page description file;
a syntax interpretation module, for performing syntax interpretation on the transparent Form to obtain a reuse type and position information of the transparent Form; generating a Color block lattice, an Alpha block lattice, a Shape block lattice and their corresponding block attribute tables and block memory tables for the transparent Form, according to the reuse type and the position information, and transmitting the obtained reuse type and position information of the transparent Form and the generated lattices and corresponding block attribute tables, block memory tables to a manager operation module;

the manager operation module, for managing reusable transparent Forms, comprising: storing information outputted from the syntax interpretation module; establishing association relationships between different transparent Forms in the page description file; computing on the generated data information to obtain and buffer assembling information of the transparent Form, according to the reuse type of the transparent Form;

an assembling manner determination module, for determining an assembling manner of the transparent Form according to the reuse type of the transparent Form and graphics status of the page to be outputted, in the assembling of the transparent Form;

an assembling module, for assembling the transparent Form into the page to be outputted, according to the assembling manner determined by the assembling manner determination module and based on the assembling information and the association relationships.

A computer readable medium having a computer program stored thereon is also provided in an embodiment of this invention, the computer program when executed on a computer causing a processor of the computer to execute the following steps:

determining a reusable transparent Form in a page description file;

performing syntax interpretation on the transparent Form to obtain a reuse type and position information of the transparent Form;

generating a Color block lattice, an Alpha block lattice, a Shape block lattice and their corresponding block attribute tables and block memory tables for the transparent Form, according to the reuse type and position information, and establishing association relationships between different transparent Forms in the page description file;

computing on the generated data information to obtain and buffer assembling information of the transparent Form, according to the reuse type of the transparent Form;

determining an assembling manner of the transparent Form according to the reuse type of the transparent Form and graphics status of the page to be outputted, in assembling of the transparent Form;

assembling the transparent Form into the page to be outputted, according to the determined assembling manner and based on the assembling information and the association relationships.

In the solution of the embodiments of the present invention, according to the attributes of resources contained in transparent Forms, a lattice-reusable Form is filtered. The lattice-reusable Form only needs to be interpreted and generated once, and the generated Form lattice information may be buffered, and for other associable Forms, it only needs to record their association relationships. In the assembling of a reusable Form, the buffered Form lattice information is acquired and is assembled into a page to be outputted according to assembling manner for transparent model. Thus, repeated interpretation processes and lattice generating processes of the reusable Form may be reduced, effectively saving time and space resources and improving rasterization efficiency of the whole file.

BRIEF DESCRIPTION OF THE DRAWINGS

The accompanying drawings herein are provided to further explain the present invention and constitute a part of this application, and the illustrative embodiments and their description are for explanation of this invention, but not for limiting the present invention, in which.

DETAILED DESCRIPTION OF THE PREFERRED EMBODIMENT

Below with reference to the accompanying drawings and embodiments, embodiments of the present invention will be further described in detail.

Files of packaging companies usually comprise duplicate objects, which are packaged into Forms and used several times. In a printing process incorporating make-up and folded hand, duplicate small pages may be treated as reused Form sub-pages. With the wider and wider application of Form reuse, in order to realize the effect of printing rich contents in natural colors, more and more applications of transparency occur in page description. Thus, the reuse problem of transparent Forms has become a focus to improve efficiency of RIP for such files.

To this end, a raster processing method and apparatus of a transparent Form is provided in an embodiment of this invention, capable of greatly reducing the number of times a transparent Form needs to be interpreted and simplifying the assembling of the Form, allowing high speed interpretation in RIP for a PDF file with reused transparent Forms, improving rasterization efficiency and saving memory resources.

Figure 1:
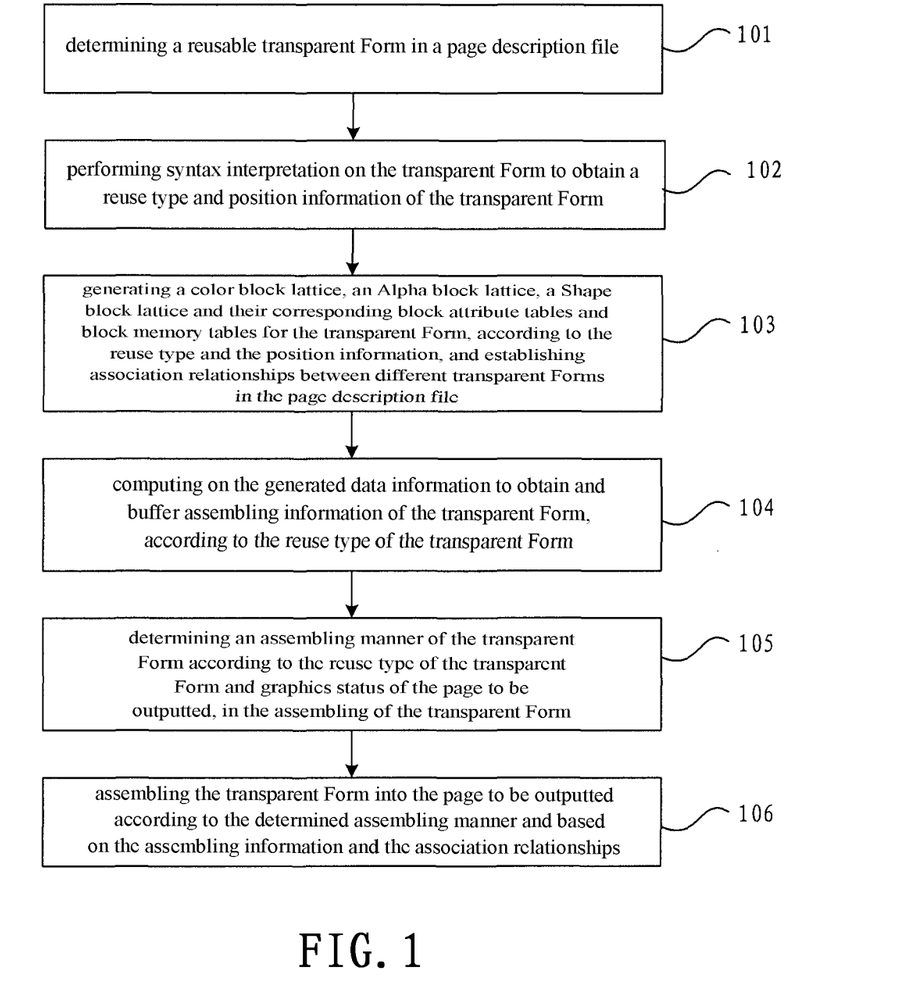
FIG. 1 is a flowchart of a raster processing method of a transparent Form according to an embodiment of this invention.

As shown in FIG. 1, it is a flowchart of a raster processing method of a transparent Form according to an embodiment of this invention, which comprises the following steps:

Step 101: determine a transparent Form that is reusable in a page description file.

As to a transparent Form that is repeatedly referenced in a page, according to the transparency distribution of the page it belongs to, attributes of resources contained in the Form itself, it may be determined whether the Form is actually reusable.

Particularly, according to a series of reuse rules, a determination may be made on transparent Forms repeatedly referenced in a page to filter transparent Forms that are actually reusable. For example, reuse rules of transparent Forms repeatedly referenced in a page may be specified as follows:

(1) if a transparent Form is of the type of mandatory replacement reuse, it is reusable; otherwise, proceed to determination (2);

(2) if a transparent Form is a Group type and is in an Isolated Group, it is reusable; otherwise, proceed to determination (3);

(3) if resources contained in a transparent Form do not overlap with each other, and all blend modes are the normal, this transparent Form is equivalent to an isolated Form and is reusable; otherwise, it is not reusable.

In this embodiment of the present invention, actually reusable transparent Forms may be divided into two classes: one needs to buffer lattice information; the other does not need to buffer lattice information, and only needs to record association relationship with a buffered lattice Form.

Further, for all actually reusable transparent Forms in a page, these transparent Forms may be managed using linked lists, each node of a linked list corresponds to an instance of a reusable transparent Form, ID identifying a Form instance is the position of the instance in the list, such that it is convenient to flexibly access information for single Form information.

Step 102: perform syntax interpretation on the transparent Form to obtain a reuse type and position information of the transparent Form.

The reuse type of the transparent Form comprises two types: mandatory replacement reuse and normal transparent reuse.

Mandatory replacement reuse refers to when assembling a reusable transparent Form in a page to be outputted, performing assembling in a top layer dominant manner. This means no transparency calculation is required between the reused transparent Form and objects overlaid by this transparent Form.

Normal transparent reuse refers to, when assembling a reusable transparent Form in a page to be outputted, performing assembling in a transparent model manner, i.e., it is necessary to perform a transparency calculation between the lattice of this transparent Form and a lattice of an area overlaid by this transparent Form. All isolated transparent Forms are normal transparent reusable.

All reusable transparent Forms may adopt normal transparent reuse. Mandatory replacement reuse is an optimal process for transparent reuse, because top layer dominant assembling is much simpler than transparent model assembling, and may save a lot of time and reduce space consumption. Imposed small pages and reused Forms in packaging files are all compliant with this requirement, and may be directly treated as reused Forms of the type of mandatory replacement. In other situations, when applying reused Forms of the type of mandatory replacement, control items may be added to a dictionary of reusable Forms to be processed in this way.

Step 103: generate a Color block lattice, an Alpha block lattice and a Shape block lattice as well as their corresponding block attribute tables and block memory tables of this transparent Form, according to the reuse type and position information, and establish association relationships between different transparent Forms in the page description file.

Note that, in the RIP process of a transparent page, it is required to generate 8-bit Color block lattices, Alpha block lattices and Shape block lattices as well as their corresponding block attribute tables and block memory tables. Irrespective of Forms of the type of normal transparent reuse or Forms of the type of mandatory replacement reuse, the above information will be generated after sub-page processing. However, depending on different backend assembling types, Form lattices required to be stored are different.

Forms of the type of normal transparent reuse need to be assembled according to the transparent assembling manner. Thus, the above information generated for the sub-page may be buffered directly.

Forms of the type of mandatory replacement reuse may be assembled in the top layer dominant manner, which is consistent with the assembling manner of non-transparent Forms, and only Color block and Mask lattices are required. Thus, after the sub-page generation, it is required to perform a calculation on the Alpha and Shape block lattices and generate and buffer a Mask lattice.

Step 104: perform a calculation on the generated data information to obtain and buffer assembling information of the transparent Form, according to the reuse type of the transparent Form.

The assembling information is the buffered information described above, and different reuse types of Forms may have different buffered information. In the case of a transparent Form of the type of mandatory replacement reuse, the assembling information comprises: Mask lattice information, color block lattice information generated for a sub-page, and corresponding block attribute tables and block memory tables; in the case of a transparent Form of the type of normal transparent reuse, the assembling information comprises: Alpha block lattice information, Shape block lattice information, color block lattice information generated for a sub-page, and corresponding block attribute tables and block memory tables. A reference may be made to above description for details of the above information.

Step 105: determine an assembling manner for the transparent Form according to the reuse type of the transparent Form and the graphics state of the page to be outputted, in the assembling of the transparent Form.

Particularly, if the reuse type of the transparent Form is normal transparent reuse, a transparent assembling manner is adopted; if the reuse type of the transparent Form is mandatory replacement reuse, when the transparent Form is in a non-transparent area of the page to be outputted, a top layer dominant assembling manner is adopted; when the transparent Form is in a transparent area of the page to be outputted, a transparent assembling manner is adopted.

Step 106: assemble the transparent Form into a page to be outputted, according to the determined assembling manner and based on the assembling information and association relationships.

If the assembling manner of the transparent Form is the top layer dominant manner, it is assembled in the same manner as that of non-transparent Forms, and is assembled into a page to be outputted on the basis of lines or blocks.

If the assembling manner of the transparent Form is the transparent assembling manner, an intersection area of the transparent Form and the page to be outputted is determined.

According to the position of the transparent Form in the intersection area, a block attribute table and a block memory table is obtained; according to the block attribute table and the block memory table, a color block lattice, an Alpha block lattice and a Shape block lattice of the transparent Form are obtained.

According to the transparency parameters of the page to be outputted, a transparency calculation is performed point by point on the a Form block and a corresponding block in the page to be outputted, so as to generate a color block lattice, an Alpha block lattice, a Shape block lattice, and corresponding block attribute tables and block memory tables of the page to be outputted.

Note that, in an embodiment of this invention, the following optimization may be performed according to the characteristics of transparent Forms of the type of mandatory replacement reuse:

It can be applied in 1-bit RIP, i.e., value of one pixel in the finally generated page lattice is represented by 1 bit. If other contents in a page than Forms of the type of mandatory replacement reuse do not have a transparent attribute, this page may be generated and assembled in a 1-bit manner. A 8-bit block lattice is generated for a Form sub-page. Due to top layer dominant assembling and the 1-bit representation of the final page lattice, it is possible to realize assembling with a 1-bit Form lattice. Thus, the 8-bit Form block lattice may be converted into a 1-bit flat lattice and than stored, without the need of storing block attribute tables, so that the amount of buffered data of the Form may be greatly reduced and data access efficiency may be increased. When assembling a reusable Form, it may be assembled directly on the basis of lines, without flattening the 8-bit lattice, which improves assembling efficiency accordingly.

Through the above optimization, the amount of stored Form data may be reduced and the calculation of Form assembling may be simplified.

The RIP process of a transparent Form differs from that of a non-transparent as follows:

(1) a transparent Form has its own BlendCS (Blend Color Space) and the process of interpreting a Form sub-page and generating a lattice is performed in this color space, which may be inconsistent with the BlendCS of the page to be outputted;

(2) the assembling of the page to be outputted needs to be performed in a BlendCS of the page to be outputted. Thus, when assembling a reused transparent Form, if the BlendCS of the Form is inconsistent with the BlendCS of the page to be outputted, it is necessary to perform a color conversion operation;

(3) a Form of the type of mandatory replacement reuse is assembled in a top layer dominant manner. A lattice buffered in the Form manager operation unit should be a lattice that will be finally rendered to the page to be outputted, i.e., the color space of the lattice should be consistent with the color space of the page to be outputted.

Thus, in an embodiment of this invention, in reuse of a transparent Form, in addition to Form information such as the position, a bit number of the lattice, and CTM (current transformation matrix), the following parameters are also required:

(1) Form Reuse Type, which determines the manner of information being stored and assembled;

(2) BlendCS of Form, which is used in color conversion;

(3) BlendCS of the page to be output, which is mainly used in a Form of the type of the mandatory replacement reuse, for color conversion on one hand, and for determining whether or not a Form is associable on other hand.

Note that, regarding whether two Forms are associable, for the reuse of a non-transparent Form, two Forms having the same name, the same bit number of lattice, the same scale factor, and merely a shift in position, are associable (can be associated with each other), and the Form lattice only needs to be interpreted and buffered once. However, a transparent page relates to BlendCS. A Form of mandatory replacement type has been converted to the BlendCS of the page to be outputted before its lattice is stored. In a file having multiple pages, if a Form of mandatory replacement type occurs in two different pages having different BlendCS, the stored lattice of the Form of mandatory replacement type naturally cannot be used in other pages having a different BlendCS. Thus, to determine whether a Form of mandatory replacement type is associable, an additional condition, i.e., whether the page to be outputted has consistent BlendCS, is required.

Form parameters of a reusable transparent Form are parsed and buffered, and intermediate instructions of the reused transparent Form are sent to an intermediate instruction file. For a reused Form requiring lattice buffering, before sending the intermediate instructions, Form sub-pages are established and rasterized to generate and store Form-related lattices.

Figure 2:
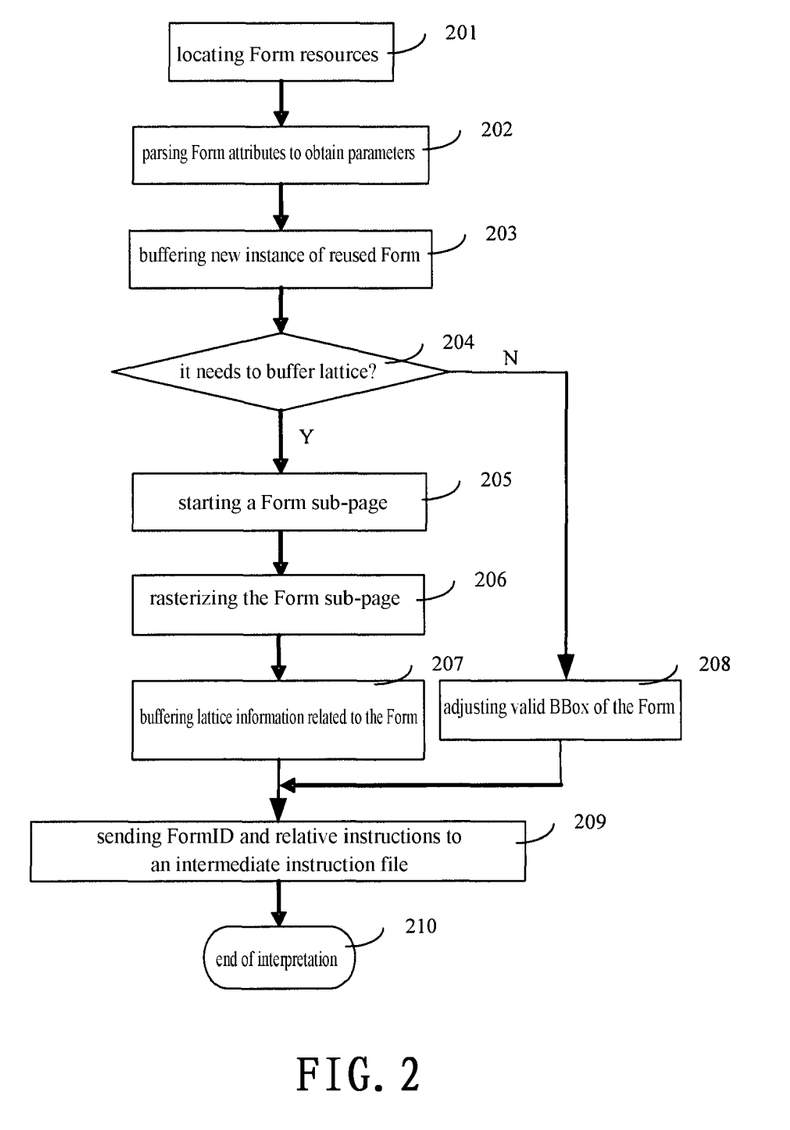
FIG. 2 is a flowchart of a syntax interpretation process of a reusable transparent Form according to an embodiment of this invention.

As shown in FIG. 2, a flowchart of syntax interpretation of a reusable transparent Form according to an embodiment of this invention comprises the following steps.

Step 201: locate Form resources;

Step 202: obtain a reuse type of the Form, BlendCS of the Form BlendCS of the page to be outputted, according to a Form dictionary, attributes of resources contained in the Form, attributes of a page to be outputted in which the Form locates;

Particularly, the reuse type of a Form is determined according to the Form dictionary and attributes of resources contained in the Form. The following two kinds of Form may be considered as the type of mandatory replacement reuse:

(1) the Form dictionary comprises a preset mandatory replacement reuse identification;

(2) those determined depending on printing experience: duplicate small pages that are imposed, reused Forms in files of packaging companies.

Forms mismatching the above two conditions are treated as normal transparent reuse.

Step 203: buffer a new Form instance;

Step 204: determine whether it is required to buffer a lattice for this Form; if so, proceed to step 205; otherwise, turn to step 208;

It is necessary to record each reused Form instance, buffer parameters related to the Form, and assign an ID. For a normal transparent reuse Form, if there is an existing Form instance having the same name, the same bit number of the lattice and the same scale factor as the current Form instance, it may be considered as associable; for a mandatory replacement reuse Form, in addition to the above conditions, associable may be determined only if a page to be outputted has the same BlendCS. As to a new Form instance with an associated Form, it is only required to record an association relationship, and adjust its valid BBox according to the valid BBox of its associated Form; as to a new Form instance without an associated Form, processes of sub-page rasterization and storing lattice are necessary.

Step 205: start a new Form sub-page, set parameters required for the rasterization of the sub-page;

Step 206: rasterize the Form sub-page, interpret the Form content stream, generate an intermediate instruction file, and obtain a Form lattice through assembling according to the intermediate instruction file.

Note that the sub-page rasterization and the assembling of the sub-page are performed by sections in a loop manner. As the result of the assembling of each section, a Form color block lattice, an Alpha block lattice, a Shape block lattice, various block attribute tables and block memory tables are generated. Then, the lattice of Form for this section is buffered, and different Form lattice information needs to be stored depending on different types of Form reuse. It is required to perform color calculation or conversion.

Step 207: buffer related data such as Form lattice, turn to step 209;

Step 208: without the need of buffering a Form instance of the lattice and rasterizing the Form sub-page, it is only required to adjust its valid BBox according to the valid BBox of an associated Form to calculate a required Form lattice according to its position when assembling a page to be outputted;

Step 209: send ID and intermediate instructions corresponding to the Form to an intermediate instruction file, so as to assemble the reused Form when assembling the Form in a page to be outputted.

Step 210: the interpretation ends.

Figure 3:
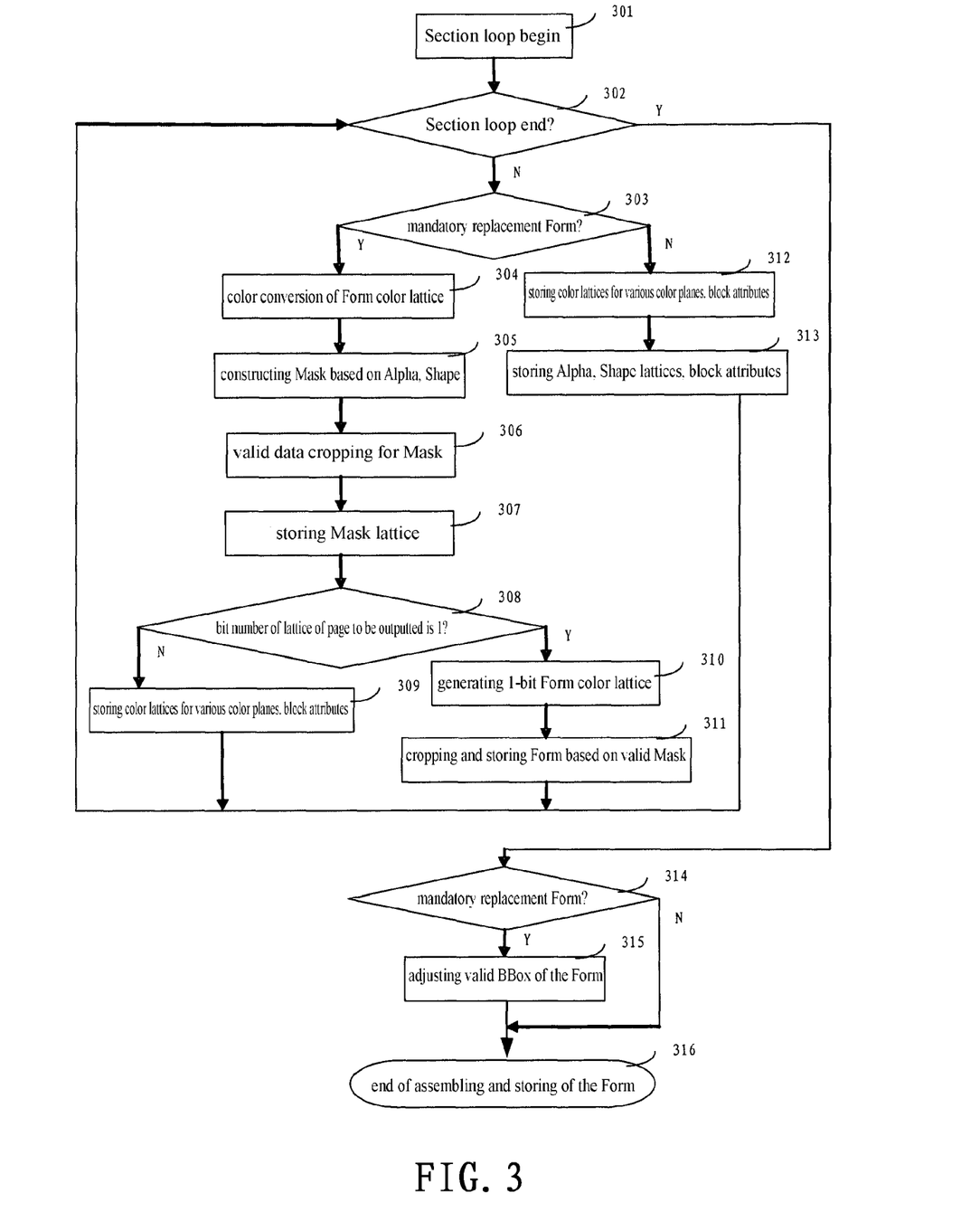
FIG. 3 is a flowchart of an information storage process of the reusable transparent Form according to an embodiment of this invention.

As shown in FIG. 3, a flowchart of storing information of a reusable transparent Form in an embodiment of this invention comprises the following steps.

Step 301: start a section loop of a sub-page;

Step 302: determine whether the section loop is finished; if so, turn to step 314; otherwise, turn to step 303;

Step 303: determine a current reuse type of Form recorded in the Form manager operation unit; in the case of mandatory replacement reuse, turn to step 304; otherwise, turn to step 312;

Step 304: determine whether the BlendCS of the Form is consistent with the BlendCS of the page to be outputted; if not, perform color conversion of the color block lattice of the Form to obtain a Form color block lattice under the BlendCS of the page to be outputted;

Step 305: construct a Mask lattice of the Form;

Note that, when assembling a Form of the type of mandatory replacement reuse, instead of performing a transparent calculation, a top layer dominant manner is adopted, so only the Form color block lattice and the Mask lattice for cropping are required. At this point, it is necessary to construct a Mask lattice according to the Alpha block lattice and the Shape block lattice.

Step 306: performing effective data cropping on the Mask lattice;

The Mask lattice is a lattice of values 0, 1 with the same size as the Form. A value 0 indicates a dot in the corresponding Form will not be drawn on the page to be outputted; a value 1 indicates the dot is drawn on the page to be outputted. The size of the Form is inconsistent with (might be significantly larger than) the area occupied by drawing objects in the Form. Thus, there will be redundant data on the periphery of the Mask lattice and the Form lattice. In order to reduce the amount of data to be accessed, an effective data calculation is performed on the Mask lattice to remove redundant data on the periphery area and obtain a Mask lattice of values 0, 1 that is actually valid for the Form;

Step 307: store the valid Mask lattice;

Step 308: determine the bit number of the lattice of the page to be outputted; if it is 1, turn to step 310; otherwise, turn to step 309;

Step 309: the Form lattice is a 8-bit block lattice, and the page to be outputted is also a 8-bit lattice, color block lattices and block attribute tables of various color planes of the Form are directly stored; the process of this section ends and the process turns to step 302;

Step 310: the Form lattice is a 8-bit lattice, and the page to be outputted is a 1-bit lattice, the Form block lattice needs to be flattened through screening to generate a 1-bit Form color lattice;

Step 311: according to the valid Mask area obtained through the cropping in step 306, crop the 1-bit Form color lattice generated in step 310 to reduce data amount, and store the color lattice after cropping; the process of this section ends and the process turns to step 302;

Step 312: as to a normal transparent reuse Form, perform color conversion only when assembling the Form into a page to be outputted; at that point, it is only required to store various color lattices and block attribute tables;

Step 313: store the Alpha block lattice, the Shape block lattice and block attribute tables for being used at the time of assembling the reused Form; the process of this section ends and the process turns to step 302;

Step 314: loops for all sections are finished; determine whether it is a mandatory replacement reuse Form; if so, turn to step 315; otherwise, turn to step 316;

Step 315: according to total valid Mask area of the Form, adjust the valid BBox of the Form;

Step 316: the assembling and storing of the Form end.

As described above, in the raster processing of a transparent Form according to this embodiment, in the assembling of a transparent Form, different assembling manners are used depending on different reuse types of the transparent Form, which will be described in detail below.

Figure 4:
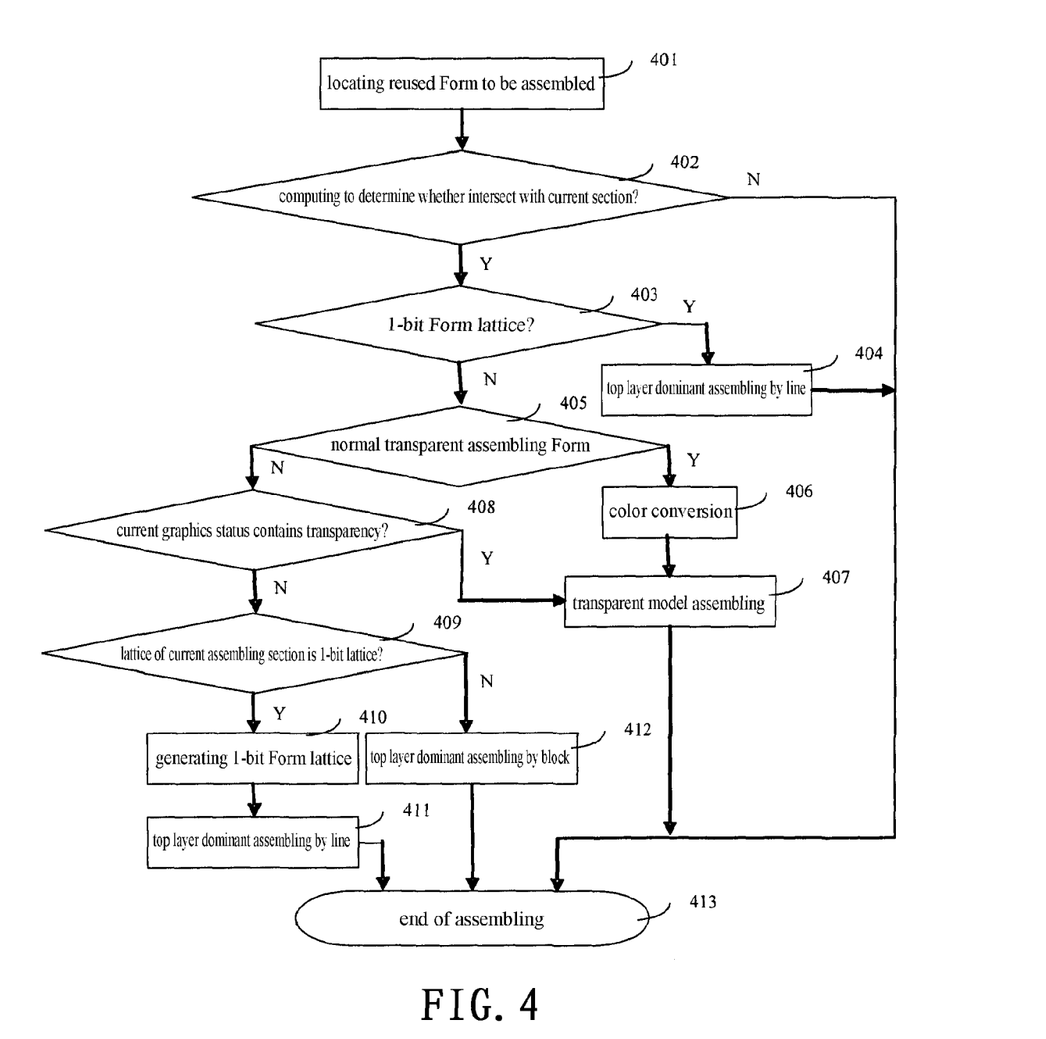
FIG. 4 is a flowchart of assembling the reusable transparent Form into a page to be outputted according to an embodiment of this invention.

As shown in FIG. 4, the flowchart of assembling a reusable transparent Form into a page to be outputted according to an embodiment of this invention comprises the following steps.

Step 401: obtain a Form ID in the intermediate instruction file, locate a reused Form instance to be assembled into a page to be outputted;

Step 402: according to the BBox of the Form, calculate whether it has an intersection area with a page section to be assembled currently; if so, proceed to step 403; otherwise, proceed to step 413;

Step 403: determine whether the current Form lattice buffered in the Form manager operation unit is a 1-bit lattice or a 8-bit lattice; if it is a 1-bit lattice, proceed to step 404; otherwise, proceed to step 405;

If the buffered lattice of the Form is a 1-bit lattice, it indicates the current transparent Form is of the type of mandatory replacement reuse, and objects other than the mandatory replacement reuse Form in the page to be outputted that is assembling do not have the transparent attribute, the bit number of sectional assembling is also 1 bit, thus the assembling manner by line of step 404 is adopted.

Step 404: apply the Mask lattice to the 1-bit Form lattice, in a top layer dominant manner, assemble by line into the page to be outputted, after which the process turns to step 413;

Step 405: as to a Form instance of 8-bit lattice, it is further determined whether it is of the type of normal transparent reuse; if so, turn to step 406; otherwise, turn to step 408;

Step 406: perform color conversion for a normal transparent reuse Form before assembling; obtain a color block lattice from the Form manager operation unit and convert it to the BlendCS color space of the page to be outputted;

Step 407: assemble the color block, Alpha block and Shape block of the Form to a page block of the page to be outputted in a transparency model calculation manner, after which the process turns to step 413;

Step 408: for a mandatory replacement reuse Form of 8-bit lattice, further determine whether the current graphics status of the page to be outputted comprises a transparent attribute; if so, also assemble the Form in a transparency calculation manner, and turn to step 407; otherwise, assemble the Form in a top layer dominant manner and turn to step 409;

Step 409: determine whether a page section lattice to be assembled is a 1-bit or 8-bit lattice; if it is a 1-bit lattice, turn to step 410; otherwise, turn to step 412;

In 1-bit RIP, if the buffered lattice of the mandatory replacement reuse Form is a 8-bit lattice, there are other transparent objects than the mandatory replacement reuse Form in the page to be outputted. In sectional assembling, 1-bit assembling is adopted for sections without transparent areas, and 8-bit assembling for sections with transparent areas. Thus, a determination will be made on the bit number of lattice of the section to be assembled, so as to adopt assembling by line or assembling by block respectively.

Step 410: flatten the 8-bit Form block lattice and generate a 1-bit lattice through screening;

Step 411: apply the Mask lattice to the 1-bit Form lattice and assemble into the page to be outputted by line in a top layer dominant manner;

Step 412: assemble the 8-bit Form block lattice into a block of the page to be outputted by block in a top layer dominant manner;

Step 413: the assembling process ends.

It can be known from the above description, the following technical effects are obtained in this invention.

This invention may greatly reduce the number of times of interpreting transparent Forms, simplify Form assembling and enable high speed interpretation of a PDF file having repeatedly referenced transparent Forms in RIP, thereby improving rasterization efficiency and saving memory resources.

According to attributes of resources contained in transparent Forms, reusable Forms are filtered. Only one interpretation and lattice generation is required for a reusable Form, and the generated Form lattice information is buffered. For other associable Forms, it is only required to record their association relationships. In the assembling of a reused Form, the buffered Form lattice information is obtained and is assembled into a page to be outputted in a transparent model assembling manner. Thus, multiple times of interpretation and lattice generation of a duplicate Form may be reduced, effectively saving time and space resources and improving rasterization efficiency of the whole file.

Furthermore, an optimization is performed for the reuse of transparent Forms in the embodiment of this invention. Mandatory replacement reuse is applied for a transparent reused Form for which it is not necessary to perform a transparency calculation with an area overlapped by the Form, and in the assembling phase, the Form is assembled in a top layer dominant manner. Compared with transparent model assembling, a great amount of calculation may be reduced, saving time and space consumption. Particularly, in 1-bit RIP, if all other objects than the mandatory replacement transparent Form in the page do not have a transparent attribute, a 1-bit rasterization is perform for the page. A 1-bit lattice may be buffered for a mandatory replacement Form. Compared with 8-bit lattices, data amount is reduced greatly and data access efficiency may be improved. Further, in the assembling of a reused Form, 1-bit lattice assembling by line only relates to memory copying operations without the need of calculation, thereby realizing fast assembling. Therefore, transparent Form files targeted to mandatory replacement reuse may save more space, and may be assembled faster, thereby have more remarkably increasing RIP efficiency.

Figure 5:
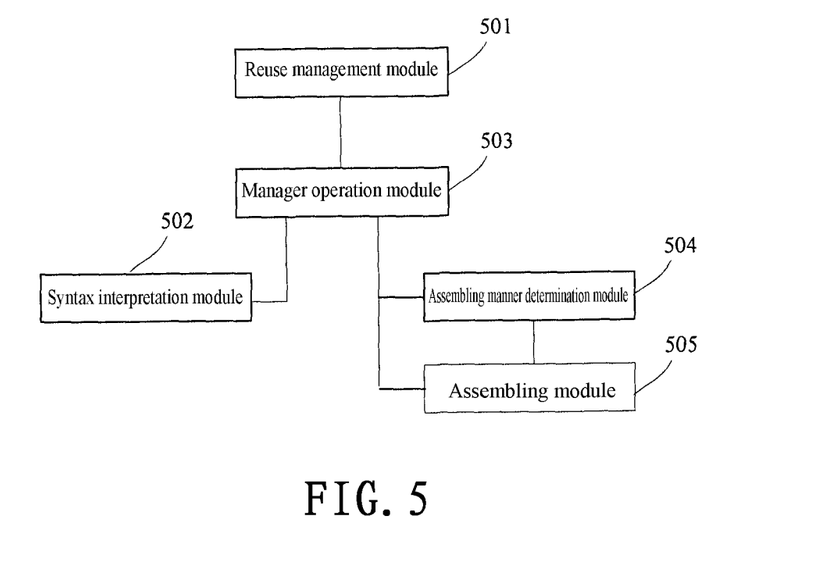
FIG. 5 is a schematic diagram of a raster processing apparatus of a transparent Form according to an embodiment of this invention.

Correspondingly, a raster processing apparatus of a transparent Form is also provided in an embodiment of this invention. A schematic diagram of the apparatus is shown in FIG. 5.

In this embodiment, the apparatus comprises: reuse management module 501, a syntax interpretation module 502, a manager operation module 503, an assembling manner determination module 504 and an assembling module 505.

The reuse management module 501 is used to make a determination on transparent Forms repeatedly referenced that are found in a RIP page interpretation process to determine a reusable transparent Form in a page description file.

The syntax interpretation module 502 is used to perform syntax interpretation on the transparent Form to obtain a reuse type and position information of the transparent Form; according to the reuse type and the position information, generate a Color block lattice, an Alpha block lattice, a Shape block lattice and their corresponding block attribute tables and block memory tables for the transparent Form; and transmit the obtained reuse type and position information of the transparent Form and the generated lattices and corresponding block attribute tables, block memory tables to the manager operation module 503.

The manager operation module 503 is used to manage reusable transparent Forms, comprising: storing information outputted from the syntax interpretation module; establishing association relationships between different transparent Forms in the page description file; according to the reuse type of the transparent Form, computing on the generated data information to obtain and buffer assembling information of the transparent Form.

The assembling manner determination module 504 is used to, in the assembling of the transparent Form, determining an assembling manner of the transparent Form according to the reuse type of the transparent Form and graphics status of the page to be outputted.

The assembling module 505 is used to according to the assembling manner determined by the assembling manner determination module 504 and based on the assembling information and the association relationships, assemble the transparent Form into the page to be outputted.

Wherein, the reuse management module 501 may comprise: an acquisition unit and a determination unit (not shown). The acquisition unit is used to acquire transparent Forms repeatedly referenced in the page description file; the determination unit is used to determine whether a transparent Form repeatedly referenced can be reused in a type of mandatory replacement reuse; if so, determine the transparent Form as a reusable transparent Form and its reuse type is mandatory replacement reuse; otherwise, further determine whether the transparent Form repeatedly referenced is an isolated group; if so, determine the transparent Form as a reusable transparent Form and its reuse type is normal transparent reuse; if the transparent Form repeatedly referenced is a group but not an isolated group, further determine whether resources contained in the transparent Form repeatedly referenced have superimposition and whether all blend models are normal; if so, determine the transparent Form as a reusable transparent Form and its reuse type is normal transparent reuse; otherwise, determine the transparent Form as a non-reusable transparent Form.

The assembling manner determination module 504 is particularly used to, when the reuse type of the transparent Form is normal transparent reuse, determine that the transparent assembling manner is adopted; when the reuse type of the transparent Form is mandatory replacement reuse, if the transparent Form is in a non-transparent area of the page to be outputted, determine that the top layer dominant assembling manner is adopted; if the transparent Form is in a transparent area of the page to be outputted, determine that the transparent assembling manner is adopted.

Correspondingly, the assembling module 505 may comprise a first assembling unit and a second assembling unit (not shown).

The first assembling unit is used to, when the assembling manner of the transparent Form is the top layer dominant assembling manner, assemble the transparent Form into a page to be outputted by line or block in the same manner as non-transparent Forms.

The second assembling unit is used to, when the assembling manner of the transparent Form is the transparent assembling manner, determine an intersection area of the transparent Form and the page to be outputted; according to a position of the transparent Form in the intersection area, obtain a block attribute table and a block memory table; and according to the block attribute table and the block memory table, obtain a color block lattice, an Alpha block lattice, and a Shape block lattice of the transparent Form; according to transparency parameters of the page to be outputted, perform a transparency calculation dot by dot on a Form block and a corresponding block in the page to be outputted, to generate a color block lattice, an Alpha block lattice, and a Shape block lattice of the block in the page to be outputted, as well as an attribute table of the corresponding block and a block memory table.

With the raster processing apparatus of a transparent Form of the embodiment of the present invention, according to the attributes of resources contained in transparent Forms, a lattice-reusable Form is filtered. The lattice-reusable Form only needs to be interpreted and generated once and the generated Form lattice information may be buffered. For other associable Forms, it is only required to record their association relationships. In the assembling of a reusable Form, the buffered Form lattice information is acquired and is assembled into a page to be outputted according to a transparent model assembling manner. Thus, repeated interpretation processes and lattice generating processes of the duplicate Forms may be reduced, thereby effectively saving time and space resources and improving rasterization efficiency of the whole file.

Obviously, those skilled in the art should understand each of the foregoing modules or steps of the present invention may be realized with general computing devices, they may be centralized on a single computing device, or distributed in a network constituted by a plurality of computing devices. Optionally, they may be realized with program codes executable by computing devices, thereby they may be stored in storage devices and executed by computing devices, or they may be made into integrated circuit modules respectively, or a plurality of modules or steps among them are made into a single integrated circuit module. In this way, the present invention is not limited to any specific combination of hardware and software.

The foregoing descriptions are preferred embodiments of the present invention and are not intended to limit the present invention. For those skilled in the art, the present invention may have various changes and modifications. Any modifications, equivalent replacements and improvements made without departing from the spirit and principle of the present invention shall be within the protection scope of the present invention.

What is claimed is:

1. A raster processing method of a transparent Form, characterized in comprising:
   determining a reusable transparent Form in a page description file;
   performing syntax interpretation on the transparent Form to obtain a reuse type and position information of the transparent Form;
   generating a color block lattice, an Alpha block lattice, a Shape block lattice and their corresponding block attribute tables and block memory tables for the transparent Form, according to the reuse type and the position information, and establishing association relationships between different transparent Forms in the page description file;
   computing on the generated data information to obtain and buffer assembling information of the transparent Form, according to the reuse type of the transparent Form;
   determining an assembling manner of the transparent Form according to the reuse type of the transparent Form and graphics status of the page to be outputted, in the assembling of the transparent Form; and
   assembling the transparent Form into the page to be outputted, according to the determined assembling manner and based on the assembling information and the association relationships.

2. The method according to claim 1, characterized in that determining the reusable transparent Form in the page description the comprises:
   acquiring transparent Forms repeatedly referenced in the page description file;
   determining whether a transparent Form repeatedly referenced can be reused in a type of mandatory replacement reuse;
   if so, determining the transparent Form as a reusable transparent Form and its reuse type is mandatory replacement reuse;
   otherwise, further determining whether the transparent Form repeatedly referenced is an isolated group;
   if so, determining the transparent Form as a reusable transparent Form and its reuse type is normal transparent reuse;
   if the transparent Form repeatedly referenced is a group but not an isolated group, further determining whether resources contained in the transparent Form repeatedly referenced have a superimposition and whether all blend models are normal;
   if so, determining the transparent Form as a reusable transparent Form and its reuse type is normal transparent reuse;
   otherwise, determining the transparent Form as a non-reusable transparent Form.

3. The method according to claim 1, characterized in that the reuse type of the transparent Form comprises: mandatory replacement reuse and normal transparent reuse.

4. The method according to claim 3, characterized in that the assembling information of the transparent Form comprises:
   for a transparent Form of mandatory replacement reuse, Mask lattice information, color block lattice information, and corresponding block attribute tables and block memory tables generated for a sub-page;
   for a transparent Form of normal transparent reuse, Alpha block lattice information, Shape block lattic information, color block lattic information, and corresponding block attribute tables and block memory tables generated for a sub-page.

5. The method according to claim 3, characterized in that determining the assembling manner of the transparent Form according to the reuse type of the transparent Form and graphics status of the page to be outputted comprises:
   if the reuse type of the transparent Form is normal transparent reuse, adopting a transparent assembling manner;
   if the reuse type of the transparent Form is mandatory replacement reuse, when the transparent Form is in a non-transparent area of the page to be outputted, adopting a top layer dominant assembling manner; when the transparent Form is in a transparent area of the page to be outputted, adopting the transparent assembling manner.

6. The method according to claim 5, characterized in that assembling the transparent Form into the page to be outputted according a to the determined assembling manner and based on the assembling information and the association relationships comprises:
- if the assembling manner of the transparent Form is the top layer dominant assembling manner, assembling the transparent Form by line or block into a page to be outputted in the same manner as non-transparent Forms;
- if the assembling manner of the transparent Form is the transparent assembling manner, determining an intersection area of the transparent Form and the page to be outputted;
- according to a position of the transparent Form in the intersection area, obtaining a block attribute table and a block memory table, and according to the block attribute table and the block memory table, obtaining a color block lattice, an Alpha block lattice, and a Shape block lattice of the transparent Form;
- according to transparency parameters of the page to be outputted, performing a transparency calculation dot by dot on a Form block and a corresponding block in the page to be outputted, to generate a color block lattice, an Alpha block lattice, and a Shape block lattice of the block in the page to be outputted, as well as an attribute table and a block memory table of the corresponding block.

7. A raster processing apparatus of a transparent Form, characterized in comprising:
- a reuse management module for making determination on transparent Forms repeatedly referenced that have been found in a RIP page interpretation process to determine a reusable transparent Form in a page description file;
- a syntax interpretation module for performing syntax interpretation on the transparent Form to obtain a reuse type and position information of the transparent Form; generating a color block lattice, an Alpha block lattice, a Shape block lattice and their corresponding block attribute tables and block memory tables for the transparent Form, according to the reuse type and the position information, and transmitting the obtained reuse type and position information of the transparent Form and the generated lattices and corresponding block attribute tables, block memory tables to a manager operation module;
- the manager operation module for managing reusable transparent Forms, comprising: storing information outputted from the syntax interpretation module; establishing association relationships between different transparent Forms in a page description file; according to the reuse type of the transparent Form, computing on the generated data information to obtain and buffer assembling information of the transparent Form;
- an assembling manner determination module for determining an assembling manner of the transparent Form according to the reuse type of the transparent Form and graphics status of the page to be outputted, in the assembling of the transparent Form; and
- an assembling module for assembling the transparent Form into the page to be outputted according to the assembling manner determined by the assembling manner determination module and based on the assembling information and the association relationships.

8. The apparatus according to claim 7, characterized in that the reuse management module comprises:
- an acquisition unit for acquiring transparent Forms repeatedly referenced in the page description file;
- a determination unit for determining whether a transparent Form repeatedly referenced can be reused in a type of mandatory replacement reuse; if so, determining the transparent Form as a reusable transparent Form and its reuse type is mandatory replacement reuse; otherwise, further determining whether the transparent Form repeatedly referenced is an isolated group; if so, determining the transparent Form as a reusable transparent Form and its reuse type is normal transparent reuse; if the transparent Form repeatedly referenced is a group but not an isolated group, further determining whether resources contained in the transparent Form repeatedly referenced have a superimposition and whether all blend models are normal; if so, determining the transparent Form as a reusable transparent Form and its reuse type is normal transparent reuse; otherwise, determining the transparent Form as a non-reusable transparent Form.

9. The apparatus according to claim 7, characterized in that the assembling manner determination module is particularly used to, when the reuse type of the transparent Form is normal transparent reuse, determine that a transparent assembling manner is adopted; when the reuse type of the transparent Form is mandatory replacement reuse, if the transparent Form is in a non-transparent area of the page to be outputted, determine that a top layer dominant assembling manner is adopted; if the transparent Form is in a transparent area of the page to be outputted, determine that the transparent assembling manner is adopted.

10. The apparatus according to claim 9, characterized in that the assembling module comprises:
- a first assembling unit for when the assembling manner of the transparent Form is the top layer dominant assembling manner, assembling the transparent Form by line or block into the page to be outputted in the same manner as non-transparent Forms; and
- a second assembling unit for, when the assembling manner of the transparent Form is the transparent assembling manner, determining an intersection area of the transparent Form and the page to be outputted; according to a position of the transparent Form in the intersection area, obtaining a block attribute table and a block memory table; and according to the block attribute table and the block memory table, obtaining a color block lattice, an Alpha block lattice; and a Shape block lattice of the transparent Form; according to transparency parameters of the page to be outputted, performing a transparency calculation dot by dot on a Form block and a corresponding block in the page to be outputted; to generate a color block lattice; an Alpha block lattice; and a Shape block lattice of the block in the page to be outputted, as well as an attribute table and a block memory table of the corresponding block.

11. A non-transitory computer readable medium having a computer program stored thereon, the computer program, when executed on a computer, causing a processor of the computer to execute the following processes;
- determining a reusable transparent Form in a page description file;
- performing syntax interpretation on the transparent Form to obtain a reuse type and position information of the transparent Form;
- generating a color block lattice, an Alpha block lattice, a Shape block lattice and their corresponding block attribute tables and block memory tables for the transparent Form, according to the reuse type and the position information, and establishing association relationships between different transparent Forms in the page description the;

computing on the generated data information to obtain and buffer assembling information of the transparent Form, according to the reuse type of the transparent Form;

determining an assembling manner of the transparent Form according to the reuse type of the transparent Form and graphics status of the page to be outputted, in the assembling of the transparent Form; and assembling the transparent Form into the page to be outputted, according to the determined assembling manner and based on the assembling information and the association relationships.

\* \* \* \* \*